United States Patent
Frank et al.

(10) Patent No.: US 8,844,152 B2
(45) Date of Patent: Sep. 30, 2014

(54) POSITION MEASURING INSTRUMENT, SCALE, AND METHOD FOR PRODUCING A SCALE

(75) Inventors: Alexander Frank, Traunstein (DE); Marc Oliver Tiemann, Salzburg (AT); Martin Heumann, Traunstein (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 353 days.

(21) Appl. No.: 13/448,590

(22) Filed: Apr. 17, 2012

(65) Prior Publication Data
US 2012/0266478 A1    Oct. 25, 2012

(30) Foreign Application Priority Data
Apr. 20, 2011   (DE) .................. 10 2011 007 756

(51) Int. Cl.
  *G01D 5/347*   (2006.01)
  *B23K 20/04*   (2006.01)
  *B23P 17/04*   (2006.01)
  *G01D 5/20*    (2006.01)

(52) U.S. Cl.
  CPC ............... *G01D 5/20* (2013.01); *G01D 5/2013* (2013.01)
  USPC ............................................ 33/708; 29/428

(58) Field of Classification Search
  USPC ............................................. 33/708; 29/428
  See application file for complete search history.

(56) References Cited

U.S. PATENT DOCUMENTS

| | | | |
|---|---|---|---|
| 3,685,029 | A | 8/1972 | Blanchard |
| 4,893,077 | A | 1/1990 | Auchterlonie |
| 6,011,389 | A | 1/2000 | Masreliez et al. |
| 6,545,461 | B1 | 4/2003 | Miyata |
| 6,736,009 | B1* | 5/2004 | Schwabe .................. 73/514.31 |
| 2002/0017902 | A1 | 2/2002 | Vasiloiu |
| 2006/0232268 | A1 | 10/2006 | Arns, Jr. et al. |
| 2012/0266478 | A1* | 10/2012 | Frank et al. .................... 33/708 |
| 2013/0227852 | A1* | 9/2013 | Schmoller et al. ............. 33/706 |
| 2013/0227853 | A1* | 9/2013 | Schmoller et al. ............. 33/706 |

FOREIGN PATENT DOCUMENTS

| | | |
|---|---|---|
| EP | 0 743 508 A2 | 11/1996 |
| EP | 1 164 358 A1 | 12/2001 |

OTHER PUBLICATIONS

Search Report dated Oct. 22, 2013 for corresponding EP Application No. EP 12 15 2572.

* cited by examiner

*Primary Examiner* — Yaritza Guadalupe-McCall
(74) *Attorney, Agent, or Firm* — Brinks Gilson & Lione (57) ABSTRACT

A method a scale having an inductively scannable graduation, the scale including a sequence of graduation elements disposed in a measuring direction and a layer stack including a succession of metal layers. The succession of metal layers includes a ferromagnetic metal carrier layer and a graduation layer that forms the sequence of graduation elements. The carrier layer is disposed between the graduation layer and a metal substrate, and the metal substrate is dimensioned to definitively determine mechanical properties of the layer stack.

24 Claims, 4 Drawing Sheets

POSITION MEASURING INSTRUMENT, SCALE, AND METHOD FOR PRODUCING A SCALE

RELATED APPLICATIONS

Applicants claim, under 35 U.S.C. §119, the benefit of priority of the filing date of Apr. 20, 2011 of a German patent application, copy attached, Serial Number 10 2011 007 756.1, filed on the aforementioned date, the entire contents of which is incorporated herein by reference.

BACKGROUND

1. Technical Field

The present invention relates to a scale having an inductively scannable graduation, a method for producing this scale, and a position measuring instrument having this scale.

2. Background Information

Position measuring instruments that operate on the inductive measurement principle have a scale which has an inductively scannable graduation. The graduation includes a succession of electrically conductive graduation elements spaced apart from one another. In the measurement mode, the graduation is scanned by a scanning unit, which has at least one excitation winding and one scanning winding. These windings are preferably applied two-dimensionally on a circuit board. An excitation current impressed on the excitation winding generates a chronologically alternating electromagnetic excitation field, which is varied as a function of position by the array of graduation elements, and, as a result, a position-dependent scanning signal is generated in the scanning winding.

Inductively scannable scales and position measuring instruments that function inductively have the advantage that they are relatively insensitive to being contaminated. In particular, they are insensitive to liquids, such as water and oils, in the space between the scale and the scanning unit, and they are therefore especially suitable for measuring angles and lengths in machine tools.

In European patent disclosure EP 0 743 508 A2, an inductively scannable scale and an inductive position measuring instrument are described. It is explained that the graduation elements include a material with high electrical conductivity and are mounted on a circuit board material, such as FR4. Because of its electrical insulation, the circuit board material is especially suitable as a carrier for the graduation elements. Because of the mechanical disadvantages of the circuit board material, it is proposed in EP 0 743 508 A2 that the graduation elements be mounted directly on a steel substrate or an invar substrate, or, in other words, on an electrically conductive material, to improve the mechanical stability.

As a condition for the use of a metal carrier, EP 0 743 508 A2 says that the electrical conductivity of the material of the carrier merely needs to be very much lower than the electrical conductivity of the material of the graduation elements. In practice, however, it has been found that when conventional steel is used as the carrier, the scanning signals are relatively weak, which is why in practice, only inductively scannable scales with an insulating carrier have become established. In such scannable scales, the graduation elements are mounted on an electrically insulating carrier, in particular on circuit board material. However, it is difficult to produce a scale of this kind in great lengths, and because of the circuit board material it is not resistant to ambient factors.

OBJECTS AND SUMMARY OF THE INVENTION

An object of the present invention is therefore to disclose an inductively scannable scale which is simple to produce even in great lengths, is insensitive to ambient factors, and which in inductive scanning produces scanning signals that can be evaluated well, or, in other words, strong scanning signals.

This object is attained by a scale having an inductively scannable graduation, the scale including a sequence of graduation elements disposed in a measuring direction and a layer stack including a succession of metal layers. The succession of metal layers includes a ferromagnetic metal carrier layer and a graduation layer that forms the sequence of graduation elements. The carrier layer is disposed between the graduation layer and a metal substrate, and the metal substrate is dimensioned to definitively determine mechanical properties of the layer stack.

The scale embodied according to the present invention has at least one inductively scannable graduation, extending in a measuring direction, which includes a sequence of graduation elements spaced apart from one another in the measuring direction. The scale includes a layer stack which solely includes a succession of metal layers, and this succession of metal layers has at least one carrier layer as well as at least one graduation layer that form the graduation elements. The carrier layer is disposed between the graduation layer and a metal substrate and includes a ferromagnetic metal, in particular a soft-magnetic metal. The substrate is dimensioned such that it definitively determines mechanical properties of the layer stack.

Preferably, the material of the carrier layer is a ferromagnetic metal having a permeability $\mu_r$ greater than 100, and the use of a metal with a permeability $\mu_r$ greater than 1000 is especially advantageous. Suitable ferromagnetic metals are mu metals, which are soft magnetic nickel-iron alloys with about 70 to 80% nickel. Mu metals are sold under the trade name Mumetall. Instead of nickel-iron alloys, other alloys or ferritic steels with a relatively high permeability, in particular greater than 100, can also be used.

The present invention makes use of the fact that in inductive scanning, alternating fields are generated, and for the efficiency of a scale what is significant is not solely the electrical conductivity of the carrier layer on which the graduation elements are mounted. In particular, the permeability of the material used as the carrier layer is equally significant. In the present invention, the frequency-dependent penetration depth of eddy currents, which is dependent on the permeability of the material used, is utilized. Especially with high-permeability materials, the penetration depth is in fact especially slight. The less the penetration depth, the higher is the effective resistance to eddy currents. Troublesome eddy currents that develop from one graduation element to a graduation element located beside it can thus be suppressed. When high-permeability ferromagnetic metals are used, the electrical conductivity of the metal plays a subordinate role.

The permeability of the carrier layer is greater than the permeability of the substrate.

As the substrate, stainless steel is preferably used. So that the substrate will definitively determine the mechanical properties of the entire layer stack and, thus, of the scale, the thickness of the substrate is a multiple of the thickness of the carrier layer. In particular, the thickness of the substrate is more than 5 to 20 times the thickness of the carrier layer.

By the provision of a relatively thick substrate for the layer sequence including the carrier layer and the graduation layer, the mechanical property of the substrate is impressed on the composite including all the layers. Because of this provision, materials of very high permeability, which may also be relatively soft and mechanically unstable, can be still be used for the carrier layer.

The materials and the thickness ratios are preferably selected such that the layer stack and, thus, the scale have a resultant coefficient of thermal expansion that differs only unsubstantially from the coefficient of thermal expansion of the substrate, in particular by a value of at most $\pm 1 \times 10^{-6} K^{-1}$. Preferably, the substrate has a coefficient of thermal expansion of about $10 \times 10^{-6} K^{-1}$, and the scale thus has a resultant coefficient of thermal expansion of about $9 \times 10^{-6} K^{-1}$ to $11 \times 10^{-6} K^{-1}$.

In a preferred embodiment, on one side of the substrate, the layer sequence is provided as a carrier layer and a graduation layer. On the other side of the substrate, at least one compensation layer is provided, which counteracts crookedness of the layer stack caused by the bimetal effect. This compensation layer preferably includes the same metal as the carrier layer, in particular also a ferromagnetic metal, which has a permeability $\mu_r$ greater than 100, in particular greater than 1000.

An especially intimate and stable bond of the layers of the layer stack is obtained if they are joined together by roll-plating, in particular cold roll-plating.

Such a scale can be used for position measuring instruments in the form of angle measuring instruments and length measuring instruments. Since a scale constructed in this way is also easy to produce in band form, it is especially suitable for length measuring instruments of great length. A scale in band form constructed in this way can also advantageously be used in angle measuring instruments if, for instance, it is applied to the inner or outer circumference of a drum. For adhesively applying the scale embodied according to the present invention, the layer stack can be augmented on its underside with an adhesive medium, in particular an adhesive tape, which for especially easy handling can be embodied as a doubled-sided adhesive tape.

The present invention also has an object of a position measuring instrument that is relatively insensitive to ambient factors and that generates scanning signals that can be evaluated well.

One such position measuring instrument includes a scale having an inductively scannable graduation, the scale including a sequence of graduation elements disposed in a measuring direction and a layer stack with a succession of metal layers, wherein the succession of metal layers has a ferromagnetic metal carrier layer and a graduation layer that forms the sequence of graduation elements. The carrier layer is disposed between the graduation layer and a metal substrate, and the metal substrate is dimensioned to definitively determine mechanical properties of the layer stack. The position measuring unit further including a scanning unit for scanning the sequence of graduation elements, wherein the scanning unit includes an excitation unit that generates an electromagnetic alternating field and a detector unit that detects the electromagnetic alternating field modulated by the sequence of graduation elements as a function of position.

Accordingly, the position measuring instrument has a scale having an inductively scannable graduation, extending in the measuring direction, which includes a sequence of graduation elements spaced apart from one another in the measuring direction. This scale includes a layer stack which solely includes a succession of metal layers, and this succession of metal layers has at least one carrier layer and at least one graduation layer that form the graduation elements. The carrier layer is disposed between the graduation layer and a metal substrate and is a ferromagnetic metal. The permeability of the carrier layer is greater than the permeability of the substrate. In particular, the material including the carrier layer has a permeability $\mu_r$ greater than 100, in particular greater than 1000. The substrate is dimensioned such that it definitively determines the mechanical properties of the layer stack. The position measuring instrument further includes a scanning unit for scanning the graduation elements of the scale, and the scanning unit has an excitation unit for generating an electromagnetic alternating field and a detector unit for detecting the electromagnetic alternating field modulated by the graduation elements as a function of position.

The excitation unit is preferably formed by at least one two-dimensional excitation winding and the detector unit is formed by at least one two-dimensional scanning winding.

In an especially advantageous embodiment, on one side of the substrate, the layer sequence provided is a carrier layer and a graduation layer. On the other side of the substrate, at least one compensation layer is provided, which preferably includes the same material as the carrier layer and is a ferromagnetic metal. The scanning unit has a shield surrounding it, and the shield is embodied such that with the compensation layer, it forms a magnetic circuit. To that end, the permeability $\mu_r$ of the metal including the compensation layer is greater than 100, in particular greater than 1000.

It is a further object of the present invention to disclose a method for simple production of an inductively scannable scale that is insensitive to ambient factors.

This object is attained according to the present invention by a method for producing a scale having a sequence of graduation elements disposed in a measuring direction. The method including forming a layer stack which has a succession of metal layers, wherein the succession of metal layers includes a ferromagnetic metal carrier layer and a graduation layer that forms a sequence of graduation elements. The method further including creating a composite so that a layer sequence of metal substrate, the ferromagnetic metal carrier layer and the graduation layer is created.

Accordingly, the scale is created by forming a purely metal composite as a layer stack including a succession of metal layers. The layer stack is a composite having a layer sequence including a metal substrate, a carrier layer and a graduation layer, the substrate being dimensioned such that it definitively determines the mechanical properties of the composite, or, in other words, of the layer stack, and, thus, of the scale. The permeability of the carrier layer is greater than that of the substrate. As the carrier layer, a ferromagnetic metal, in particular a soft-magnetic metal, is used with a permeability $\mu_r$ greater than 100, preferably greater than 1000.

For creating a scale for a length measuring system of great length, the layer stack is formed of metal bands, which are joined together by roll-plating, in particular cold roll-plating.

After that, the layer stack thus formed can be further processed as a composite. If it should be necessary, a surface treatment can be performed, and the composite can be tailored to the required dimensions. The graduation elements are formed out of the graduation layer by known structuring methods, such as a photochemical etching process.

All the figures given for permeability refer to the operation of the position measuring instrument, hence at an exciter current frequency of more than 1 MHz.

Advantages as well as details of the present invention will become apparent from the ensuing description of exemplary embodiments in conjunction with the appended drawings.

DETAILED DESCRIPTION OF THE PREFERRED EMBODIMENTS

Figure 1:
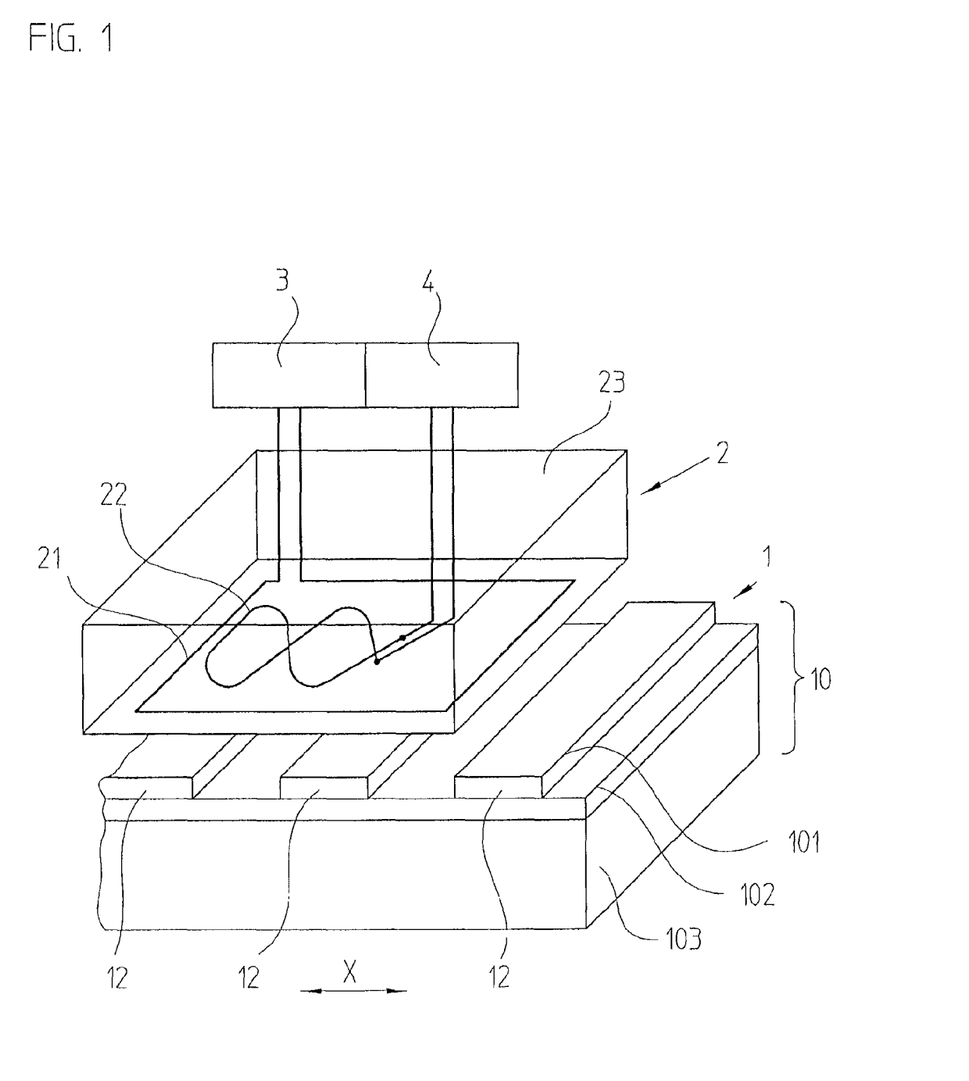
FIG. 1 is a perspective view of an embodiment of an inductive position measuring instrument in accordance with the present invention.

In the perspective view of FIG. 1, the basic layout of a position measuring instrument having a scale 1 designed in accordance with the present invention is shown. The scale 1 has a graduation which can be scanned by a scanning unit 2 facing it at a slight distance therefrom. For position measurement in a measuring direction X, a relative motion is brought about between the scale 1 and the scanning unit 2. The graduation includes a periodic succession of electrically conductive graduation elements 12 spaced apart from one another in the measuring direction X. In the exemplary embodiment shown, the graduation elements 12 are flat and rectangular. However, the graduation elements can also have other shapes, such as round or triangular. The entirely flat shape of the graduation elements 12 is not a condition, either; a graduation element can also be embodied as a closed winding. Preferably, in each graduation element 12, eddy currents that counteract an excitation field originating in the scanning unit 2 can develop.

The scanning unit 2 is shown only schematically in FIG. 1, in order to explain the function of the inductive scanning in cooperation with the scale 1. The scanning unit 2 has at least one excitation unit, in particular in the form of a two-dimensional excitation winding 21, which is supplied by a triggering unit 3 with an excitation current in such a way that a chronologically alternating electromagnetic excitation field is generated in the vicinity of the graduation elements 12. This excitation current has a frequency of several MHz, for example. The excitation winding 21 is disposed spatially in such a way that in the succession of graduation elements 12 facing it, the excitation winding 21 develops an electromagnetic field that is as homogeneous as possible.

The scanning unit 2 furthermore has at least one detector unit, in particular in the form of a two-dimensional scanning winding 22. The embodiment and spatial disposition of the excitation winding 21 are such that in the vicinity of the scanning winding 22, as homogenous a field shape as possible is generated. To that end, the scanning winding 22 is located inside the excitation winding 21. The excitation field generated by the excitation winding 21 generates eddy currents in the graduation elements 12, and these eddy currents generate a counterpart field counter to the excitation field. In the scanning winding 22, a voltage is induced which is dependent on the position relative to the electrically conductive graduation elements 12, because of the excitation field associated with it. The graduation elements 12 are spatially disposed in the measuring direction X in such a way that they vary the excitation field as a function of position. The excitation winding 21 is thus inductively coupled with the scanning winding 22 as a function of the relative position of the graduation elements 12 in the measuring direction X. The electromagnetic alternating field is modulated by the graduation elements 12 as a function of position in the measuring direction X. As a result, the voltage induced in the scanning winding 22 also varies as a function of position. The voltage induced in the at least one scanning winding 22 is delivered to an evaluation unit 4, which forms an electric position-dependent signal from it.

The disposition of the excitation winding 21 and the scanning winding 22 in the form of conductor tracks mounted on a common carrier 23 is especially advantageous. As schematically shown in FIG. 1, these conductor tracks are disposed on the side of the carrier 23 that faces the succession of graduation elements 12 at a slight distance. The carrier 23 can be embodied as a circuit board, for instance. The graduation elements 12 of the scale 1 are preferably disposed in the same plane, which is oriented parallel to the plane in which the excitation winding 21 and the scanning winding 22 extend.

In a manner not shown here, a plurality of scanning windings phase-offset from one another are typically provided in the scanning unit 2, for generating a plurality of scanning signals phase-displaced from one another, for instance scanning signals in quadrature. This embodiment is not shown in FIG. 1, for the sake of simplicity.

Figure 2:
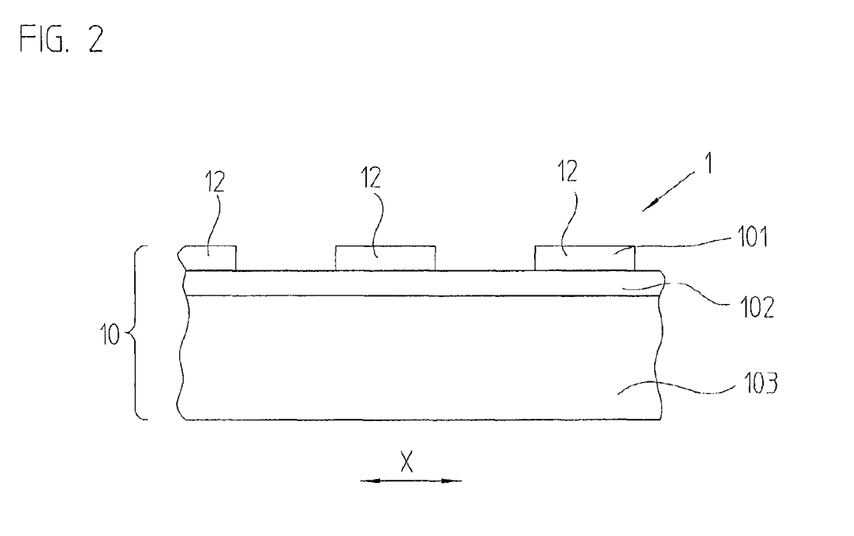
FIG. 2 shows an embodiment of a scale of the position measuring instrument of FIG. 1 in accordance with the present invention.

The scale 1 is formed of a layer stack 10, which includes a metal composite, or in other words a succession of metal layers 101, 102, 103, as shown in more detail in FIG. 2. This embodiment has the particular advantage that in the measurement mode the scale 1 is especially insensitive to ambient media. The layers 101, 102, 103 of the layer stack 10 are solidly bonded to one another, or, in other words, are not displaceable relative to one another.

The succession of metal layers 101, 102, 103 of the layer stack 10 has at least one carrier layer 102, which is a ferromagnetic metal. This metal is preferably soft-magnetic. Over this continuous carrier layer 102, a graduation layer 101 is applied, which once it has been structured forms the graduation elements 12 of the scale 1 that are spaced apart from one another in the measuring direction X. As to the material for these graduation elements 12, metals, such as copper, aluminum, silver, gold, or alloys containing these metals, are used. The material of the graduation elements 12 has high electrical conductivity but is not ferromagnetic. The permeability $\mu_r$ of the material including the graduation layer 101, and hence the graduation elements 12, is approximately 1.

The layer stack 10 further includes a substrate 103, on which the succession of the carrier layer 102 and the graduation layer 101 is provided. This substrate 103 is dimensioned such that it definitively determines the mechanical properties of the layer stack 10. For that purpose, the thickness of the substrate 103 is a multiple, in particular by a factor of 5 to 20, of the thickness of the carrier layer 102 and a multiple of the thickness of the graduation layer 101. The thickness ratios are selected such that the coefficient of thermal expansion of the scale 1 is determined predominantly by the substrate 103.

The permeability of the carrier layer 102 is greater than the permeability of the substrate 103. The permeability $\mu_r$ of the metal including the carrier layer 102 is as high as possible, in particular being greater than 100 and advantageously greater than 1000.

As the material for the substrate 103, stainless steel with high tensile strength and a high $R_{p0.2}$ elongation limit is chosen, in particular stainless and temperable stainless steel. By such tempering, the mechanical properties are improved and the dimensional stability, flexibility, and toughness are increased. If a substrate 103 in band form is used, then because of the flexibility of the band it can be rolled up for shipping or storage without experiencing plastic deformation. By the creation of a firm bond of the layers 102 and 101 with the substrate 103, these advantageous mechanical properties are imparted to the entire layer stack 10 and, thus, to the scale 1.

Having the continuous carrier layer 102 disposed immediately beneath the graduation elements 12 and including material of high permeability has the advantage that troublesome eddy currents, which develop from one graduation element 12 to a graduation element 12 disposed beside it, are at least largely suppressed. The precondition for this is that, depending on the material chosen, the thickness of the carrier layer 102 be selected as sufficiently great. The thickness should be a multiple, by a factor of 5, for example, of the penetration depth δ of the eddy currents:

$$\delta = \frac{1}{\sqrt{\pi \cdot f \cdot \mu_0 \cdot \mu_r \cdot \sigma}}$$

in which
δ=penetration depth (depth at which the current has dropped to approximately 37% of the surface value)
σ=specific electrical resistance of the material
f=frequency
$\mu_0$=permeability constant in a vacuum
$\mu_r$=relative coefficient of permeability of the material.

For instance, if a so-called mu metal is used as the carrier layer 102, such as a NiFe alloy with approximately 80% Ni, then the following dimensioning rules apply:
permeability $\mu_r$=5000
specific electrical resistance: 0.55 μΩm
relevant frequency range: 1 MHz to 10 MHz (examples of frequencies).

Depending on the penetration depth δ calculated from this, a resultant optimal thickness of the carrier layer 102 is as follows:
penetration depth δ at 1 MHz=5.3 μm
=>optimal thickness≈27 μm (5 times the penetration depth δ)
penetration depth δ at 10 MHz=1.7 μm
=>optimal thickness≈9 μm (5 times the penetration depth δ)

At a thickness of the carrier layer 102 of approximately 15 μm, a substrate 103 with a thickness of from 75 μm to 300 μm is used.

In a band form of scale 1 that is easy to produce—especially by roll-plating—and that is also easy to handle, the thickness of the carrier layer 102 is at most 50 μm. The total thickness of the layer stack 10 is less than 1000 μm.

Since the relative coefficient of permeability $\mu_r$ of the material including the carrier layer 102, at high values in this respect, is the determining variable, the magnitude of the electrical conductivity of the carrier layer 102 is of lesser importance. The penetration depth δ is especially low in a material with high permeability, and the material presents major resistance for the eddy currents. The metal carrier layer 102 is thus an effective resistance for the eddy currents between the graduation layer 101 and the substrate 103. As a consequence, the eddy currents stay for the most part in the graduation elements 12 of the scale 1. There is no longer a troublesome electrically conductive connection between the graduation elements 12 that are spaced apart from one another in the measuring direction X.

The disposition of the carrier layer 102 between the graduation layer 101 and the substrate 103 has the advantage that in the selection of the material for the carrier layer 102, the primary attention can be given to the magnetic properties. The mechanical properties of the carrier layer 102 are of lesser importance, since the mechanical properties of the layer stack 10 are determined primarily by the substrate 103. For instance, if a substrate 103 in band form is used, then because of the flexibility of the band-like substrate 103, the scale 1 can be rolled up for shipping or storage, without resultant plastic deformation of the scale 1. The use of a substrate 103 that determines the mechanical properties of the scale 1 have the advantage that now materials with very high permeability can be used for the carrier layer 102. As a rule, these materials have the disadvantage that they are relatively soft and can easily become plastically deformed.

The layers 101, 102, 103 of the layer stack 10 are intimately joined together by two-dimensional contact with one another so that the layer stack 10 can be handled as a scale 1. An especially advantageous method for production is roll-plating, with which the layers 101, 102, 103 of the layer stack 10 are inseparably joined together. Either hot rolling or cold rolling can be employed as the roll-plating. As a result, a graduation layer 101 that adheres extremely well to the carrier layer 102 is obtained. Moreover, an intimate two-dimensional connection is achieved between the substrate 103 and the carrier layer 102. This intimate connection ensures that the mechanical properties of the substrate 103 will predominate and be imparted to the further layers 101, 102 of the layer stack 10, in particular its flexibility and its properties in terms of its coefficient of thermal expansion. Roll-plating has the advantage that especially long scales 1, with a length of over several meters, can be produced because the layer stack 10 is produced from metal bands.

Figure 3A:
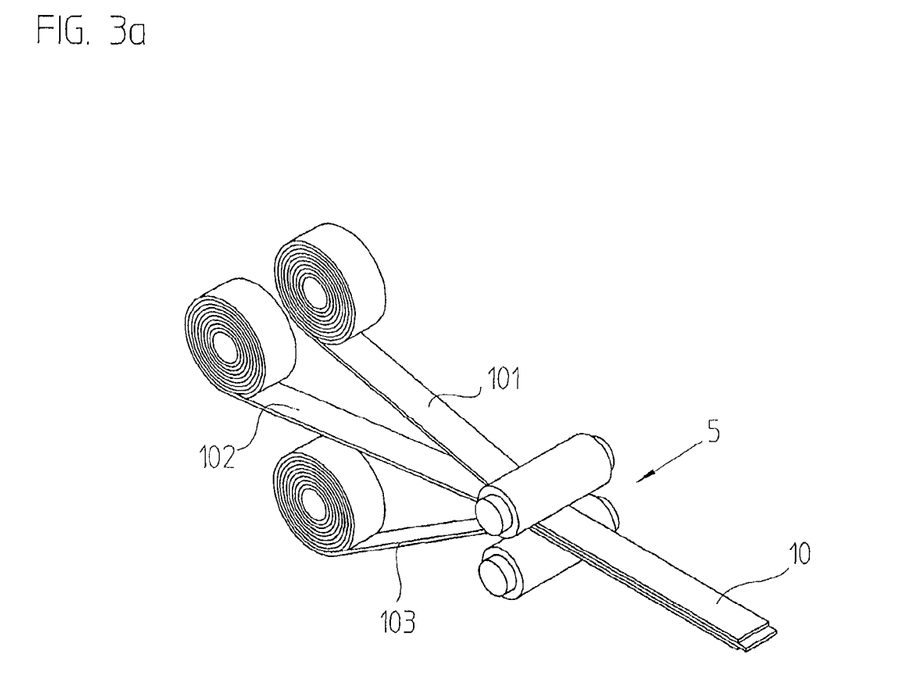
FIG. 3a shows a first method step for producing the scale of FIG. 2 in accordance with the present invention.

For forming the layer stack 10, cold roll-plating is especially suitable. It is a creative shaping process, in which the cleaned and possibly pretreated layers 101, 102, 103 in the form of metal bands are rolled, all together, in the cold state, or, in other words below the temperature of recrystallization. Because of the great pressures that then arise, reductions in thickness of 30 to 60% are attained, on the one hand, and, on the other hand, a solid, inseparable bond is created between the individual layers 101, 102, 103. This intimate bond is due to forces of adhesion, mechanical clamping of the surfaces, and metal bonds.

In FIG. 3a, the method of cold roll-plating for producing the layer stack 10 is shown schematically. The substrate 103, the carrier layer 102 and the graduation layer 101 are in band form and are delivered together to a rolling apparatus 5, in which they are united with one another at high pressure.

Figure 3B:
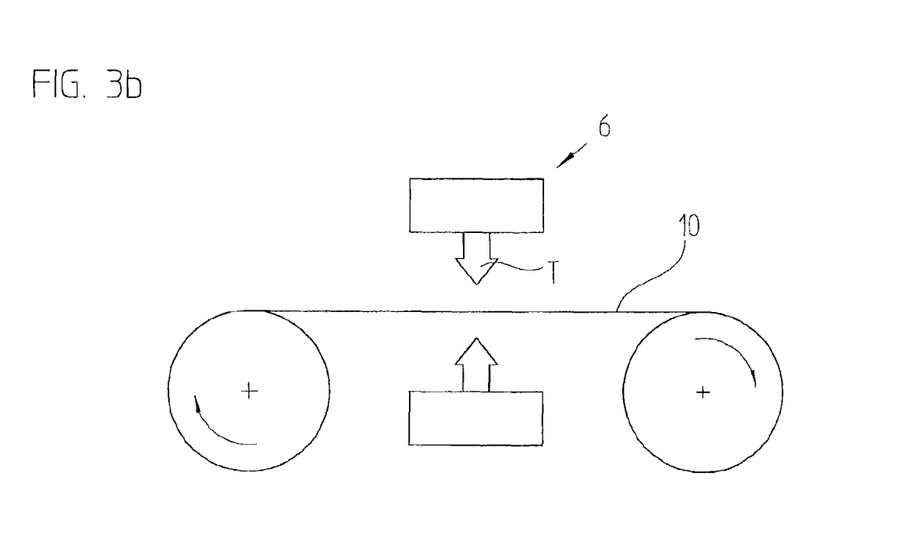
FIG. 3b shows a second method step for producing the scale of FIG. 2 in accordance with the present invention.

The actual rolling operation is followed by an annealing treatment, also called diffusion annealing or adhesive annealing. In this heat treatment, a material crystallization takes place on the one hand. On the other hand, a further hardening of the connection takes place in the connection zones between the individual layers 101, 102, 103. In FIG. 3b, one such annealing treatment of the rolled layer stack 10 is shown. The layer stack 10 is guided through an annealing apparatus 6, in which the layer stack is exposed to a high temperature T. Preferably, at least one further annealing treatment follows. If steel is chosen as the substrate 103, then this steel can be tempered in a further annealing treatment. An annealing treatment can also serve to optimize the magnetic properties, such as the permeability of the carrier layer 102.

If needed, a plurality of rolling and annealing processes can be performed one after another, to achieve the desired parameters of the layer stack 10.

After that, as a composite, the layer stack 10 thus formed can be processed further. If necessary, a surface treatment can be done, and the composite can be brought to the required dimensions by tailoring. The graduation elements 12 are formed out of the graduation layer 101 by known structuring methods, such as a photochemical etching process.

Figure 4:
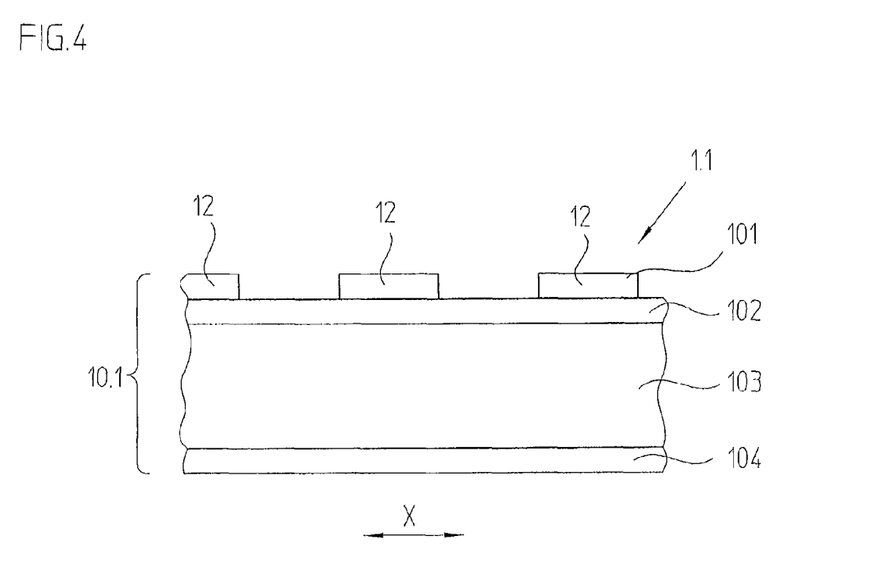
FIG. 4 shows a second embodiment of a scale in accordance with the present invention.

One further embodiment of a scale 1.1 will now be described with respect to FIGS. 4-5. To reduce thermal stresses on the scale 1.1, a symmetrical layered construction of the layer stack 10.1 is particularly advantageous. One example of this is shown in FIG. 4. Here, a compensation layer 104, which is intended to avert warping of the substrate 103 caused by the one-sided coating with the carrier layer 102 and the graduation layer 101, is applied to the back side of the substrate 103. This is intended in particular to prevent or at least largely avoid any crookedness that might be introduced through the carrier layer 102 as a result of the bimetal effect. Advantageously, for this purpose the compensation layer 104 applied to the back side of the carrier layer 102 is of the same material as the carrier layer 102. The thickness of the compensation layer 104 is selected to be such that crookedness of the substrate 103 is avoided. Here again, the thickness ratios are preferably selected such that the mechanical properties and the coefficient of thermal expansion of the scale 1.1 are determined predominantly by the substrate 103.

It is especially advantageous if the layer stack 10.1, including the graduation layer 101, the carrier layer 102, the substrate 103, and the compensation layer 104, is again jointly assembled into an intimate bond by a rolling process, in particular cold roll-plating.

Figure 5:
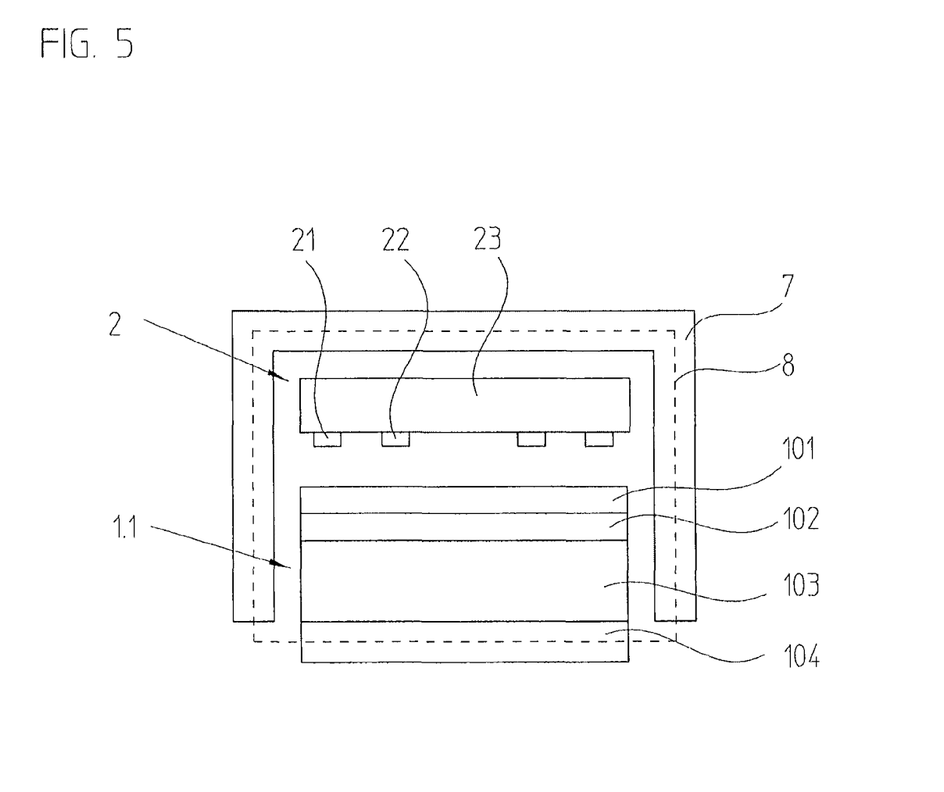
FIG. 5 shows a second embodiment of a position measuring instrument having the scale shown in FIG. 4 in accordance with the present invention.

As shown in FIG. 5, the compensation layer 104 on the back side of the substrate 103 can additionally be used for shielding the position measuring instrument from external magnetic interference fields. To that end, a magnetic shield 7 is disposed surrounding the scanning unit 2 and extends into the vicinity of the compensation layer 104. The shield 7 includes a flux-conducting material, in particular, soft-magnetic metal, so that together with the compensation layer 104, an at least largely closed magnetic circuit 8 is formed. The shield 7 surrounds the scanning unit 2 and the scale 1.1 in U-shaped fashion on three sides. The shield 7 extends over the ferromagnetic carrier layer 102 and extends at least largely as far as the compensation layer 104.

If necessary for certain applications, the scale 1 of FIG. 1-2 or 1.1 of FIGS. 4-5 can additionally be protected against ambient factors by providing at least the top side of the scale 1 or 1.1 with a protective layer. This protective layer can be a coat of paint, a powder coating, a DLC layer, or a metal layer.

The present invention is described using a single-track incremental scale 1 or 1.1 as an example. The present invention can also be implemented in multi-track incremental or absolute scales. An absolute scale can be embodied in single-track fashion in the form of a so-called PRC code or chain code, or as a multi-track code with a plurality of incremental tracks, disposed side by side, with different graduation periods, for instance in the form of a gray code or as a so-called Vernier system with a plurality of incremental tracks disposed side by side, with only slightly different graduation periods.

The foregoing description is provided to illustrate the present invention, and is not to be construed as a limitation. Numerous additions, substitutions and other changes can be made to the invention without departing from its scope as set forth in the appended claims.

We claim:

1. A scale having an inductively scannable graduation, the scale comprising:
   a sequence of graduation elements disposed in a measuring direction; and
   a layer stack comprising a succession of metal layers, wherein said succession of metal layers comprises a ferromagnetic metal carrier layer and a graduation layer that forms said sequence of graduation elements; and
   wherein said carrier layer is disposed between said graduation layer and a metal substrate, and said metal substrate is dimensioned to definitively determine mechanical properties of said layer stack.

2. The scale as defined by claim 1, wherein a permeability of said carrier layer is greater than a permeability of said substrate.

3. The scale as defined by claim 2, wherein said carrier layer is a soft-magnetic metal.

4. The scale as defined by claim 1, wherein said carrier layer is a soft-magnetic metal.

5. The scale as defined by claim 1, wherein said carrier layer is a metal having a permeability $\mu_r$ greater than 100.

6. The scale as defined by claim 5, wherein said permeability $\mu_r$ greater than 1000.

7. The scale as defined by claim 1, wherein said graduation layer has a permeability $\mu_r$ of approximately 1 and comprises one of the metals copper, aluminum, gold, or silver.

8. The scale as defined by claim 1, wherein said metal substrate comprises stainless steel.

9. The scale as defined by claim 1, wherein a thickness of said metal substrate is a multiple of a thickness of said carrier layer.

10. The scale as defined by claim 1, wherein on one side of said metal substrate is provided said carrier layer and said graduation layer, and on another side of said metal substrate a compensation layer is provided, which counteracts sagging of said layer stack caused by a bimetal effect.

11. The scale as defined by claim 10, wherein said compensation layer comprises a ferromagnetic metal.

12. The scale as defined by claim 1, wherein said succession of metal layers are joined together by roll-plating.

13. The scale as defined by claim 12, wherein said succession of metal layers are joined together by cold roll-plating.

14. A position measuring instrument, comprising:
   a scale having an inductively scannable graduation, said scale comprising:
      a sequence of graduation elements disposed in a measuring direction; and
      a layer stack comprising a succession of metal layers, wherein said succession of metal layers comprises a ferromagnetic metal carrier layer and a graduation layer that forms said sequence of graduation elements; and
      wherein said carrier layer is disposed between said graduation layer and a metal substrate, and said metal substrate is dimensioned to definitively determine mechanical properties of said layer stack;
   a scanning unit for scanning said sequence of graduation elements, wherein said scanning unit comprises:
      an excitation unit that generates an electromagnetic alternating field; and
      a detector unit that detects said electromagnetic alternating field modulated by said sequence of graduation elements as a function of position.

15. The position measuring instrument as defined by claim 14, wherein said excitation unit comprises a two-dimensional excitation winding, and said detector unit comprises a two-dimensional scanning winding.

16. The position measuring instrument as defined by claim 15, wherein on one side of said metal substrate is provided said carrier layer and said graduation layer and on another side of said metal substrate is provided a compensation layer of ferromagnetic metal; and said scanning unit comprises a shield embodied such that with said compensation layer a magnetic circuit is formed.

17. The position measuring instrument as defined by claim 14, wherein on one side of said metal substrate is provided said carrier layer and said graduation layer and on another side of said metal substrate is provided a compensation layer of ferromagnetic metal; and said scanning unit comprises a shield embodied such that with said compensation layer a magnetic circuit is formed.

18. A method for producing a scale having a sequence of graduation elements disposed in a measuring direction, the method comprising:

forming a layer stack which comprises a succession of metal layers, wherein said succession of metal layers comprises a ferromagnetic metal carrier layer and a graduation layer that forms a sequence of graduation elements; and creating a composite so that a layer sequence of metal substrate, said ferromagnetic metal carrier layer and said graduation layer is created.

19. The method as defined by claim 18, wherein said carrier layer comprises a soft-magnetic metal.

20. The method as defined by claim 19, wherein said carrier layer comprises a metal having a permeability $\mu_r$ greater than 100.

21. The method as defined by claim 20, wherein said carrier layer comprises a metal having a permeability $\mu_r$ greater than 1000.

22. The method as defined by claim 18, further comprising joining together metal bands of said layer stack by roll-plating.

23. The method as defined by claim 22, wherein said roll-plating is cold roll-plating.

24. The method as defined by claim 22, wherein said sequence of graduation elements are formed by structuring said graduation layer after said roll-plating.

* * * * *